United States Patent
Fung et al.

(10) Patent No.: US 9,636,618 B2
(45) Date of Patent: May 2, 2017

(54) SMOKE EXHAUST SYSTEM FOR A COOKING APPLIANCE

(71) Applicant: CONAIR CORPORATION, Stamford, CT (US)

(72) Inventors: Kam Fai Fung, Hong Kong (CN); Kin Man Lai, Hong Kong (CN)

(73) Assignee: Conair Corporation, Stamford, CT (US)

( * ) Notice: Subject to any disclaimer, the term of this patent is extended or adjusted under 35 U.S.C. 154(b) by 327 days.

(21) Appl. No.: 13/958,692

(22) Filed: Aug. 5, 2013

(65) Prior Publication Data

US 2015/0033952 A1  Feb. 5, 2015

(51) Int. Cl.

| | |
|---|---|
| *A47J 37/00* | (2006.01) |
| *B01D 46/00* | (2006.01) |
| *A47J 37/06* | (2006.01) |
| *F24C 15/20* | (2006.01) |
| *B01D 46/10* | (2006.01) |
| *A47J 36/38* | (2006.01) |
| *B01D 53/04* | (2006.01) |

(52) U.S. Cl.
CPC .......... *B01D 46/0038* (2013.01); *A47J 36/38* (2013.01); *A47J 37/0611* (2013.01); *B01D 46/10* (2013.01); *F24C 15/2035* (2013.01); *B01D 53/04* (2013.01); *B01D 2253/102* (2013.01); *B01D 2257/90* (2013.01); *B01D 2258/0275* (2013.01)

(58) Field of Classification Search
CPC ........... A47J 37/0611; A47J 2037/0617; A21B 5/023; B01D 46/10

USPC ......... 99/372, 373, 374, 375, 376, 377, 378, 99/379, 380; 95/273, 285

See application file for complete search history.

(56) References Cited

U.S. PATENT DOCUMENTS

| | | |
|---|---|---|
| 2,033,060 A | 3/1936 | Anderson |
| 2,057,501 A | 10/1936 | Parr |
| 2,607,287 A | 8/1952 | Price |
| 2,719,903 A | 10/1955 | Oertli |
| 4,034,663 A * | 7/1977 | Jenn ................................ 99/446 |
| 4,036,995 A | 7/1977 | Koether et al. |
| 4,088,067 A | 5/1978 | Kaebitzsch et al. |
| 4,206,345 A | 6/1980 | Maass et al. |
| 4,697,504 A | 10/1987 | Keating |
| 4,989,580 A * | 2/1991 | Dunham ..................... 126/41 R |
| 5,237,914 A | 8/1993 | Carstensen |
| 5,467,696 A | 11/1995 | Everhart |
| 5,531,155 A | 7/1996 | Pellicane et al. |
| 5,712,466 A | 1/1998 | Spicer |
| 5,758,568 A | 6/1998 | Moravec |

(Continued)

FOREIGN PATENT DOCUMENTS

EP   2062514   *   5/2009   .......... A41J 37/0611

*Primary Examiner* — Reginald L Alexander
(74) *Attorney, Agent, or Firm* — Grogan, Tuccillo & Vanderleeden, LLP

(57) ABSTRACT

A cooking appliance includes a lower housing having a lower heating surface, an upper housing operatively connected to the lower housing and having an upper heating surface, and a smoke exhaust system. The smoke exhaust system includes an air inlet in a lower surface of the upper housing adjacent to the upper heating surface, an exhaust vent formed in the upper housing, and a fan disposed in the upper housing. The fan is configured to draw air through the inlet, into the upper housing, and expel the air through the exhaust vent.

4 Claims, 6 Drawing Sheets

(56) References Cited

U.S. PATENT DOCUMENTS

| | | |
|---|---|---|
| 5,848,567 A | 12/1998 | Chiang |
| 5,992,302 A | 11/1999 | Geisler |
| 6,062,130 A | 5/2000 | Brady |
| D436,498 S | 1/2001 | Carlson et al. |
| 6,389,959 B1 | 5/2002 | Robertson |
| 6,439,108 B1 | 8/2002 | Wu |
| RE37,988 E | 2/2003 | Uss |
| 6,539,842 B1 | 4/2003 | Chapman et al. |
| 6,591,740 B1 | 7/2003 | Hsu |
| 6,595,116 B1 | 7/2003 | Lin |
| 6,705,306 B1 | 3/2004 | Dickey |
| 6,747,250 B1 * | 6/2004 | Cha ................ 219/400 |
| 7,514,655 B2 | 4/2009 | Fernandez et al. |
| 7,608,803 B2 | 10/2009 | Jerovsek |
| 7,717,028 B2 | 5/2010 | Serra |
| 7,960,673 B2 * | 6/2011 | Li ................ 219/450.1 |
| 8,122,816 B2 | 2/2012 | Yu |
| 8,261,657 B2 | 9/2012 | Serra et al. |
| 2004/0074398 A1 | 4/2004 | Griffin et al. |
| 2005/0139086 A1 | 6/2005 | McHutchison |
| 2009/0165774 A1 | 7/2009 | Johnston et al. |
| 2012/0137897 A1 | 6/2012 | Tahincioglu |

\* cited by examiner

SMOKE EXHAUST SYSTEM FOR A COOKING APPLIANCE

FIELD OF THE INVENTION

The present invention relates to cooking appliances and, more particularly, to a smoke exhaust system for a cooking appliance.

BACKGROUND OF THE INVENTION

Cooking appliances, and in particular electric cooking/grilling devices such as griddles, are known. One type of known grilling devices typically evidences a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of convenience and cleanliness. As will be readily appreciated, it is typical that smoke is generated during cooking due to the contact of food items or fluids with the heating surfaces. This smoke may contain objectionable odors. Accordingly, there is a need for a system that reduces or contains the smoke and associated foul odors expelled from the cooking appliance during cooking.

SUMMARY OF THE INVENTION

It is an object of the present invention to provide a cooking appliance having an exhaust system.

It is another object of the present invention to provide a cooking appliance having a smoke exhaust system for reducing smoke and associated foul odors expelled from the appliance during cooking.

It is another object of the present invention to provide a cooking appliance having a smoke exhaust system that removes impurities and particulates from smoke and outputs clean or purified air.

These and other objects are achieved by the present invention.

According to an embodiment of the present invention a cooking appliance includes a lower housing having a lower heating surface, an upper housing operatively connected to the lower housing and having an upper heating surface, and a smoke exhaust system. The smoke exhaust system includes an air inlet in a lower surface of the upper housing adjacent to the upper heating surface, an exhaust vent formed in the upper housing, and a fan disposed in the upper housing. The fan is configured to draw air through the inlet, into the upper housing, and expel the air through the exhaust vent.

According to another embodiment of the present invention a smoke exhaust system for a cooking appliance having a lower housing having a lower heating plate and an upper housing having an upper heating plate operatively connected to the lower housing is provided. The smoke exhaust system includes an air inlet in a lower surface of the upper housing adjacent to the upper heating plate, an exhaust vent formed in the upper housing, and a fan disposed in the upper housing above the upper heating plate. The fan is configured to draw air through the inlet, into the upper housing, and expel the air through the exhaust vent.

According to yet another embodiment of the present invention, a method of reducing smoke and associated odors in a cooking appliance having an upper housing having a first heating surface and a lower housing having a second heating surface is provided. The method includes the steps of operatively connecting the upper housing with the lower housing such that the first heating surface is positioned in opposition to the second heating surface, and equipping the cooking appliance with a smoke reduction system including an air inlet adjacent to the first heating surface, an exhaust vent formed in the upper housing, and a fan disposed in the upper housing. The fan is configured to draw air through the inlet, into the upper housing, and expel the air through the exhaust vent.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
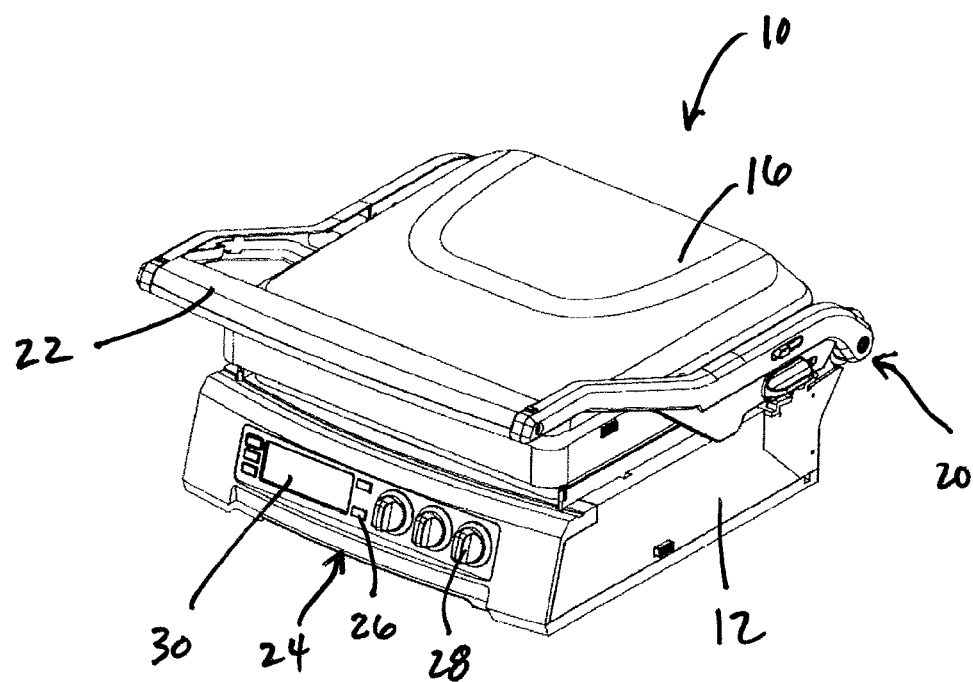
FIG. 1 is a perspective front view of a cooking appliance according to an embodiment of the present invention.
Figure 2:
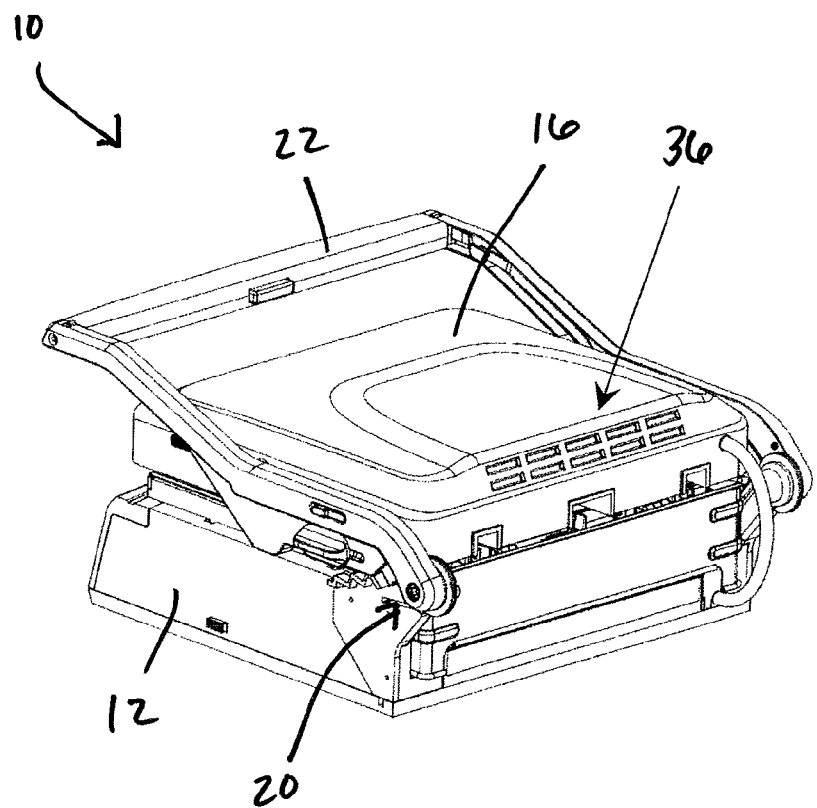
FIG. 2 is a perspective rear view of the cooking appliance of FIG. 1.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18.

As best shown in FIG. 2, the upper housing 16 is operatively connected to the lower housing 12 at a rear hinge 20. A handle 22 is attached to the upper housing 16 and allows a user to raise and lower the upper housing 16, via rotation about the hinge 20, in order to selectively position the upper housing 16 in various positions in relation to the lower housing 12.

With further reference to FIGS. 1 and 2, the cooking appliance 10 includes a control panel 24 having an array of buttons 26 and rotatable knobs 28 that allow a user to select and set a variety of cooking and heating parameters, and an LCD screen 30 that allows a user to view the parameters being set, as well as to monitor the cooking process.

Figure 3:
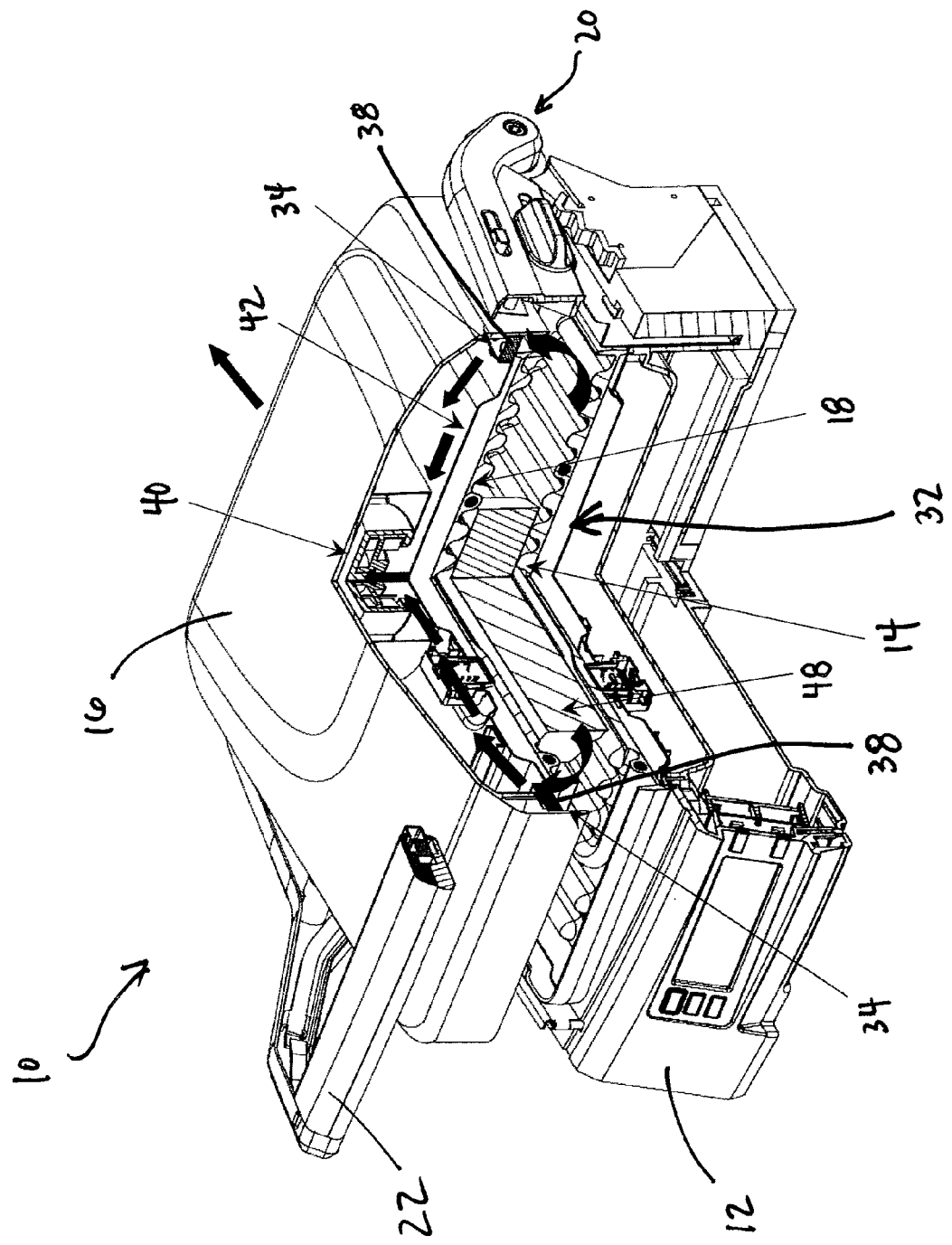
FIG. 3 is a partial cross-sectional view of the cooking appliance of FIG. 1, illustrating a smoke exhaust system of the cooking appliance.

Turning now to FIGS. 3-6, the cooking appliance 10 also includes a smoke exhaust system 32 for containing and filtering smoke generated during the cooking process. As best shown in FIG. 3, the smoke exhaust system 32 includes an air inlet 34 on the bottom surface of the upper housing 16 along an outer periphery thereof (between the upper heating plate 18 and the edge of the upper housing 16), and an exhaust vent 36 formed in the rear of the upper housing 16. A filter 38 is selectively positionable in the inlet 34. The smoke exhaust system 32 further includes an exhaust fan 40 disposed within the upper housing above the upper heating plate 18 (and above the upper reflector plate 42 contained within the upper housing 16 atop the upper heating plate 18).

Figure 5:
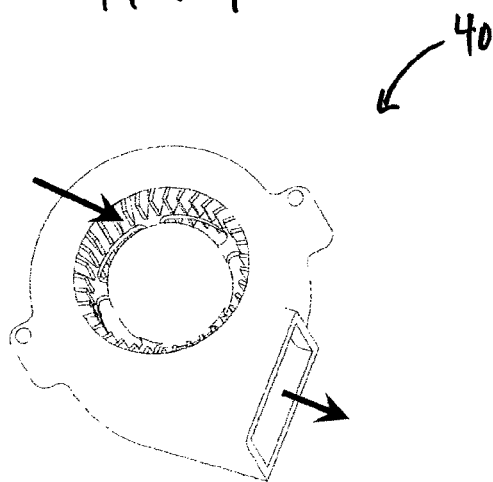
FIG. 5 is a perspective view of an exhaust fan of the smoke exhaust system of FIG. 3.

With particular reference to FIG. 5, in the preferred embodiment, the exhaust fan 40 is a centrifugal fan, also know as a 'blower' or 'squirrel cage fan.' As shown therein, the fan has an air inlet 44 and an air outlet 46. Importantly, the fan 40 functions to draw air from between the heating plates 14, 18 into the upper housing 18, and expel the air through the exhaust vent 36, as discussed in detail below. Indeed, as will be readily appreciated, the air outlet 46 of the fan 40 is adjacent to the exhaust vent 36 in the upper housing 18.

Figure 4:
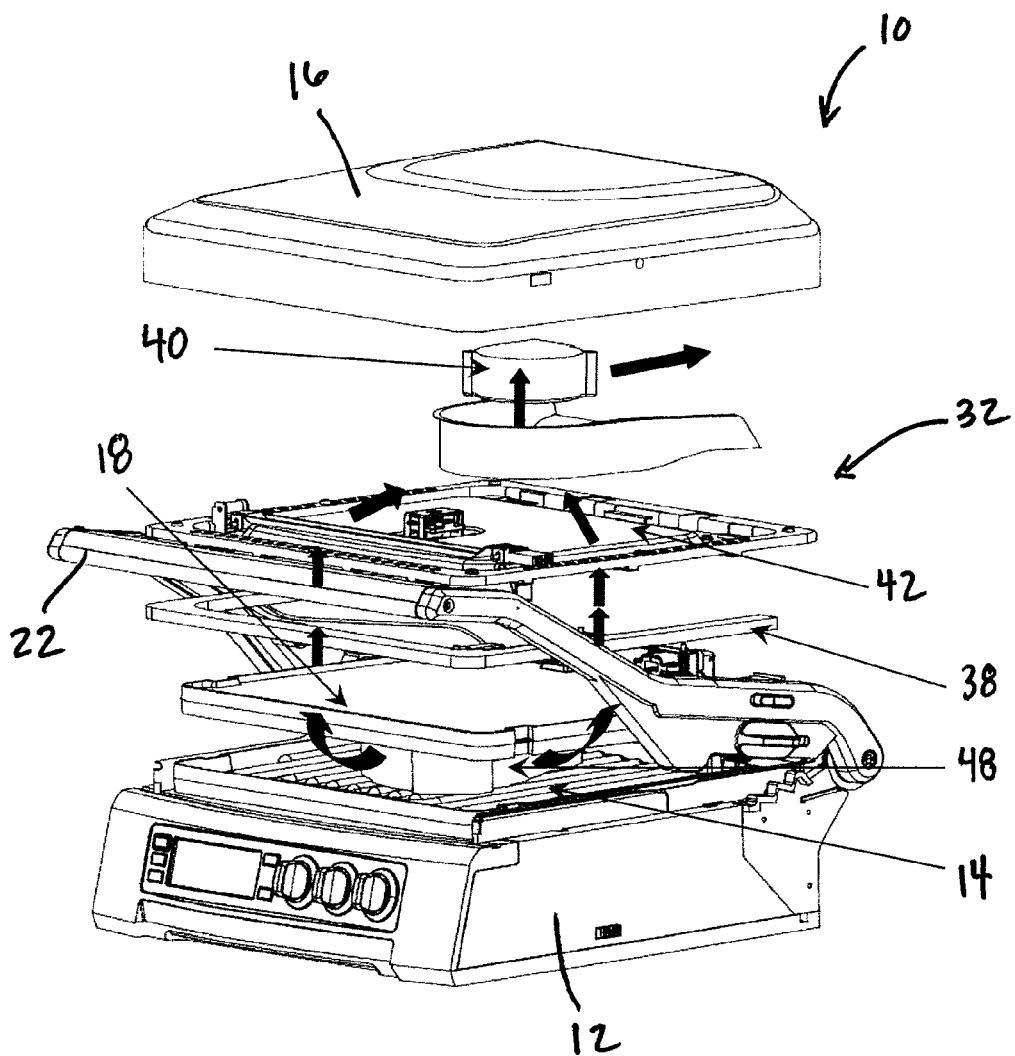
FIG. 4 is a partial exploded view of the cooking appliance of FIG. 1, illustrating the smoke exhaust system.
Figure 6:
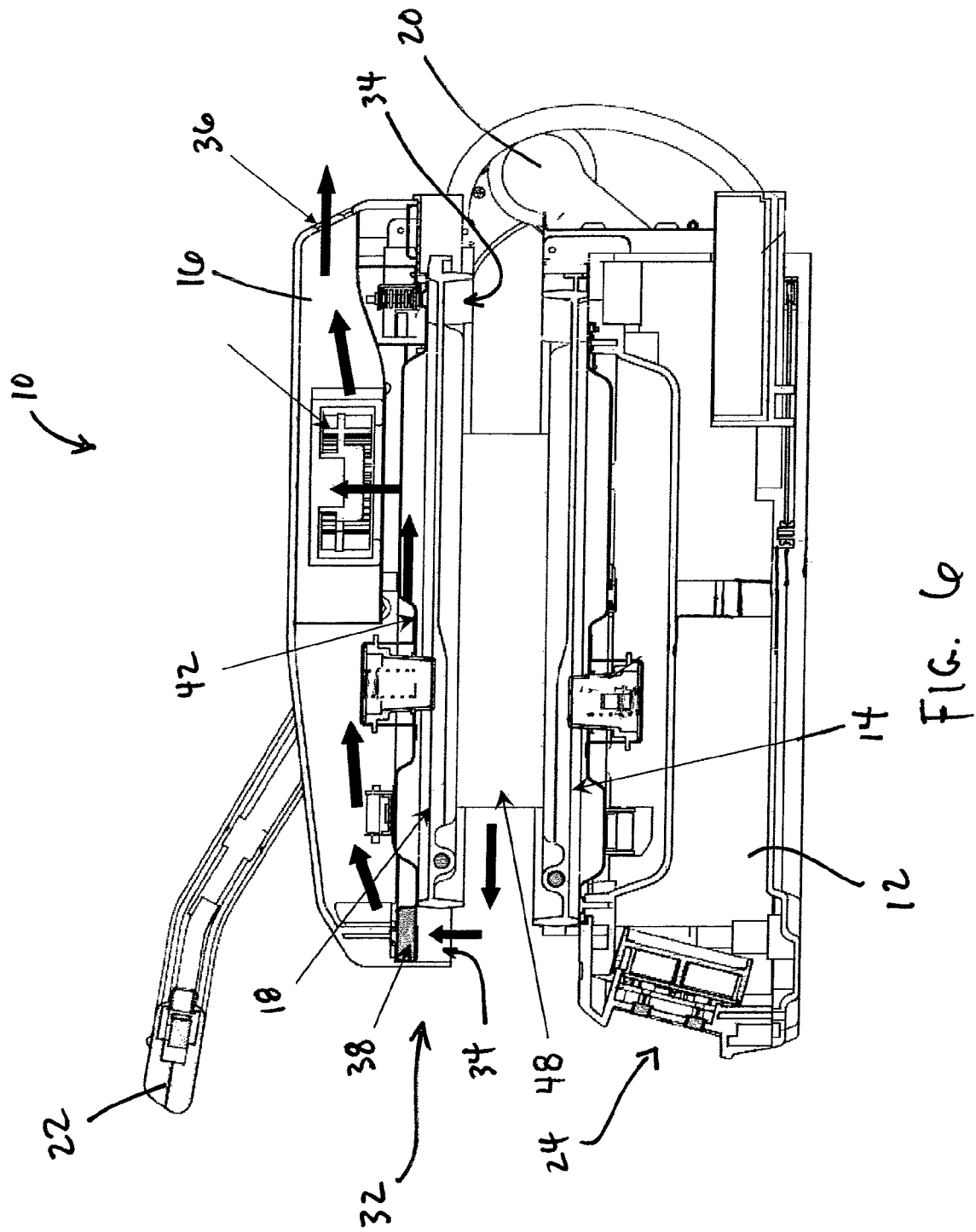
FIG. 6 is a side, cross-sectional view of the cooking appliance of FIG. 1.

As best shown in FIGS. 3, 4 and 6, during cooking of a food item 48, smoke may be generated due to the food item 44 or fluids from the food item 48 being in prolonged contact with one or both of the upper heating plate 18 and the lower heating plate 14. As shown therein, the arrows denote hot smoke generated during cooking and the pathway through which the smoke travels throughout the smoke exhaust system 32. In operation, as hot smoke is generated, it rises up and is drawn into the air inlet 34 and through the air filter 38 by the fan 40. Importantly, the filter 38 functions to remove particulates and impurities in the smoke (which give to smoke its objectionable and foul odor) as it travels therethrough. Once the smoke is purified it is exhausted as clean hot air through the exhaust vent 36 in the rear of the upper housing 18 by the fan 40.

Importantly, as the fan 40 draws air/smoke from between the upper and lower heating plates 18, 14 into the upper housing 18, such smoke is prevented from escaping the area between the heating plates 14, 18 other than through the air inlet 34 and the filter 38. In this manner, generated smoke is contained, filtered, and exhausted as clean air by the smoke exhaust system 32. As will be readily appreciated, smoke and associated foul odors expelled from the appliance during cooking are therefore substantially reduced or eliminated.

Figure 7:
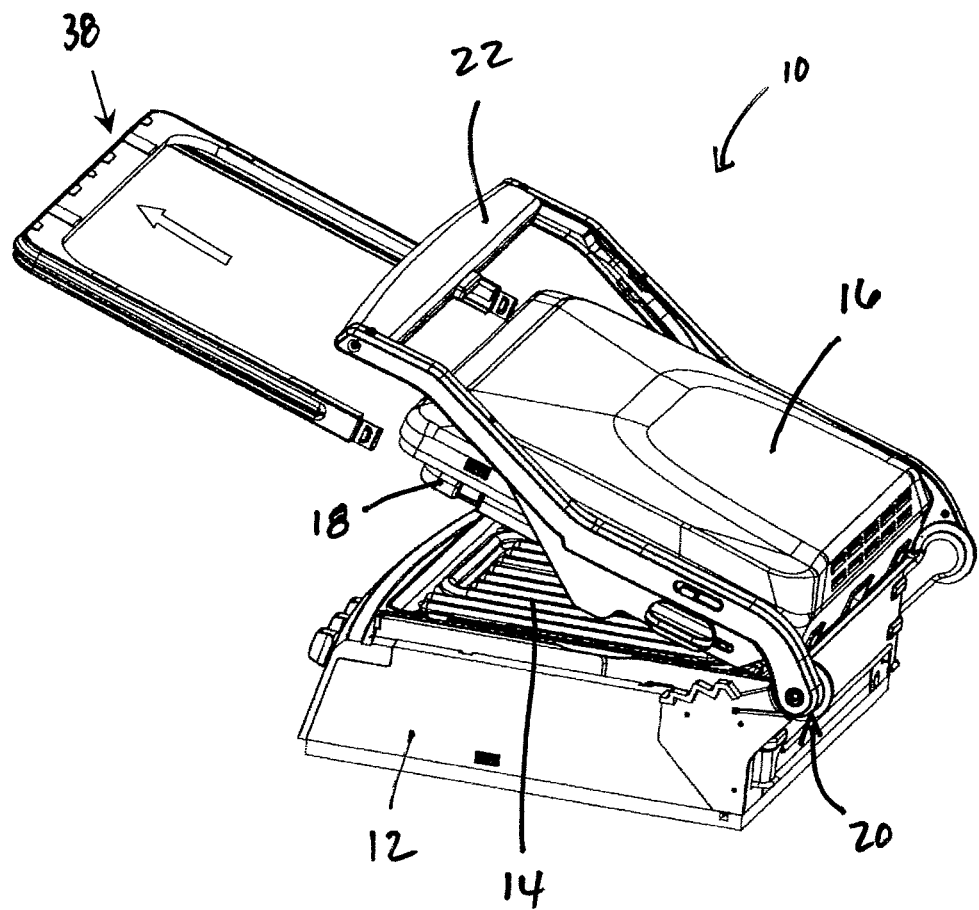
FIG. 7 is a perspective view of a replaceable filter of the smoke exhaust system of FIG. 3.

In the preferred embodiment, the filter 38 is an activated carbon cotton filter. The filter 38 is substantially U-shaped and surrounds the upper heating plate on the front and sides thereof. Preferably, the filter 38 is selectively removable from the cooking appliance 10 to allow for cleaning or replacement of the filter 38, in the manner illustrated in FIG. 7.

Figure 8:
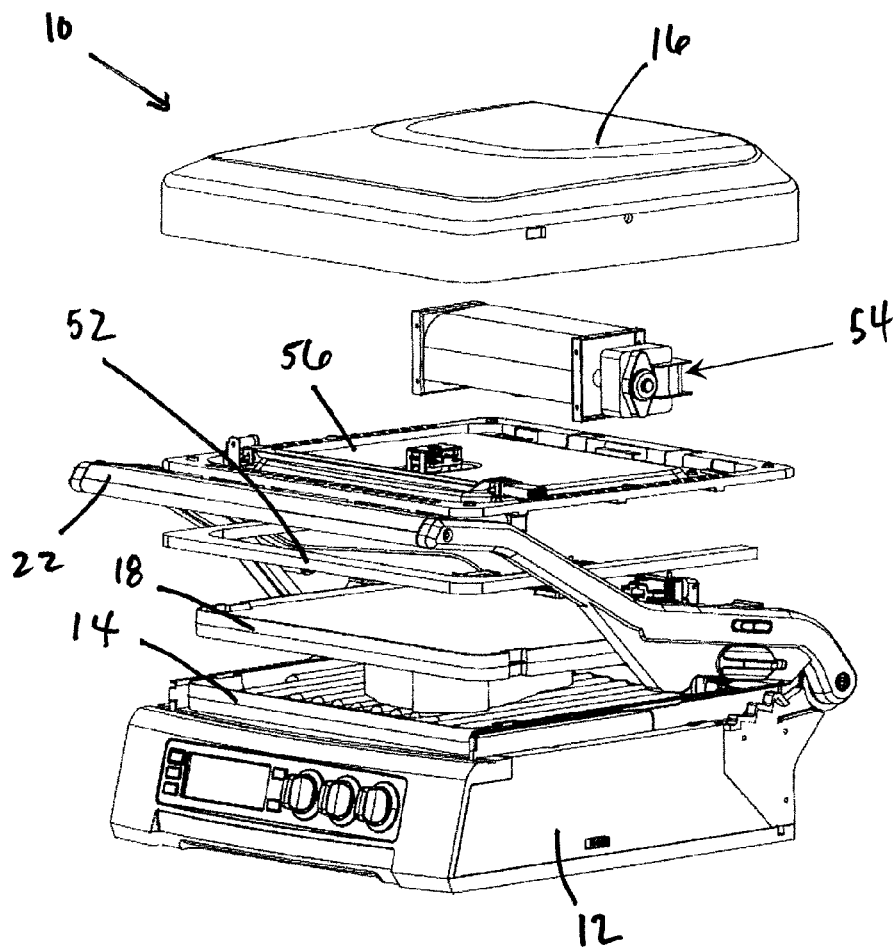
FIG. 8 is a partial exploded view of the cooking appliance of FIG. 1, illustrating a smoke exhaust system according to another embodiment of the present invention.
Figure 9:
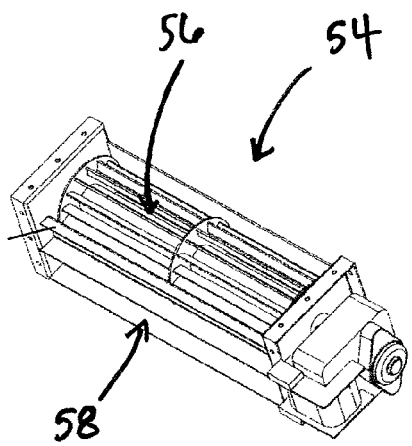
FIG. 9 is a perspective view of an exhaust fan of the smoke exhaust system of FIG. 8.

With reference to FIGS. 8 and 9, an alternative smoke exhaust system 50 for a cooking appliance 10 is shown. As shown therein, the cooking appliance 10 is substantially the same as described above. Moreover, the smoke exhaust system is substantially similar to the smoke exhaust system 32 described above and includes an air inlet on the bottom surface of the upper housing 16 along an outer periphery thereof (between the upper heating plate 18 and the edge of the upper housing 16), and an exhaust vent formed in the rear of the upper housing 16. A filter 52 is selectively positionable in the inlet. The smoke exhaust system 50 further includes an exhaust fan 54 disposed within the upper housing above the upper heating plate 18 (and above the upper reflector plate 56 contained within the upper housing 16 atop the upper heating plate 18).

As best shown in FIG. 9, the exhaust fan 54 is a cross flow fan. The fan 54 has an air inlet 56 and an air outlet 58. As with the fan 40, cross flow fan 54 functions to draw air from between the heating plates 14, 18 into the upper housing 18, and expel the air through the exhaust vent in a similar manner to that discussed above.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method of reducing smoke and associated odors in a cooking appliance having an upper housing having a first heating surface and a lower housing having a second heating surface, said method comprising the steps of:
    operatively connecting said upper housing with said lower housing such that said first heating surface is positioned in opposition to said second heating surface;
    equipping said cooking appliance with a smoke reduction system including an air inlet adjacent to said first heating surface, an exhaust vent formed in said upper housing, an air passageway between said air inlet and said vent, and a fan disposed in said upper housing
    positioning a filter adjacent said air inlet, wherein said fan is configured to draw air through said filter prior to said air passing through said air passageway and through said exhaust vent.

2. The method according to claim 1, further comprising the step of:
    arranging a filter in said air inlet.

3. The method according to claim 2, wherein:
    said filter is an activated carbon cotton filter.

4. The method according to claim 1, wherein:
    said fan is a centrifugal fan.

* * * * *